United States Patent [19]

Bailey

[11] 4,023,555
[45] May 17, 1977

[54] SOLAR HEATING DEVICE

[76] Inventor: Paul F. Bailey, 511 SW. 10th Ave., Portland, Oreg. 97205

[22] Filed: Apr. 5, 1976

[21] Appl. No.: 673,599

[52] U.S. Cl. .............................. 126/270; 126/271; 237/1 A; 52/65; 350/167
[51] Int. Cl.² ........................................... F24J 3/02
[58] Field of Search ........... 126/270, 271; 237/1 A; 60/641; 52/65, 306, 537; 350/167, 293, 294; 353/3

[56] References Cited
UNITED STATES PATENTS 3,012,294   12/1961   Waldor ............................. 126/270

FOREIGN PATENTS OR APPLICATIONS 1,520,370   4/1968   France ............................. 126/271

*Primary Examiner*—Kenneth W. Sprague
*Assistant Examiner*—James C. Yeung
*Attorney, Agent, or Firm*—Kolisch, Hartwell, Dickinson & Stuart

[57] ABSTRACT

Solar heating apparatus, including a reflector assembly made up of multiple adjustable cylindrical reflector bodies which direct the sun's rays toward a heat collector.

10 Claims, 6 Drawing Figures

SOLAR HEATING DEVICE

This invention relates to solar heating apparatus, and more particularly to apparatus of this description incorporating a reflector assembly operating to direct the sun's rays against a heat collector means in the apparatus.

In solar apparatus, maximum efficiencies are realized if the angle of incidence of the sun's rays against the heat collector means is approximately at a right angle. The sun, of course, by reason of the earth's rotation, is constantly changing its position in the sky during the course of a day, and the seasons of the year also affect the sun's position. It would be possible to provide an adjustable mounting for a heat collector whereby such directly faces the sun during the progress of a day, but this introduces a number of complexities rendering the approach impractical in the context of a simple and reliable heating system for dwellings.

This invention contemplates solar heating apparatus for homes and the like which includes a reflector assembly with multiple reflector bodies therein, each including a mirror or reflector surface utilized to reflect the sun's rays whereby such are caused to impinge directly against a heat collecting means. The reflector bodies are adjustable to change the position of their mirror surfaces as required to follow the travel of the sun during the course of a day. The reflector assembly may be mounted, for instance, on the roof of a house, and provide for more efficient transmission of the sun's energy to the collector means, with the apparatus being relatively unobtrusive, minimally exposed to wind damage, not requiring an intricate mounting, and generally avoiding of many of the disadvantages characterizing a system which relies upon a heat collecting means following the sun in its path.

The solar heating apparatus contemplated possesses a number of unique features. For instance, in a preferred embodiment of the invention it is contemplated that the reflector bodies be part of a canopy which is disposed above the heat collector means in the apparatus. This may take the form of a watertight structure preventing the passage of water through the canopy, with the canopy thus adapted for external use as a protective convering over the heat collector means in the apparatus. The reflector bodies are advantageously made as elongate cylindrical bodies having mirror or reflector surfaces carried internally therein. The cylindrical bodies are revolvable about their axes to change the angular position of the mirror surfaces. It is further contemplated in a preferred embodiment of the invention that these cylindrical bodies be supported in a holder taking the form of a substantially imperforate light pervious member, channeled and revolvably receiving in such channels the cylindrical reflector bodies.

These and various other objects and advantages are obtained by the invention, which will be described hereinbelow in conjunction with the accompanying drawings, wherein.

Figure 1:
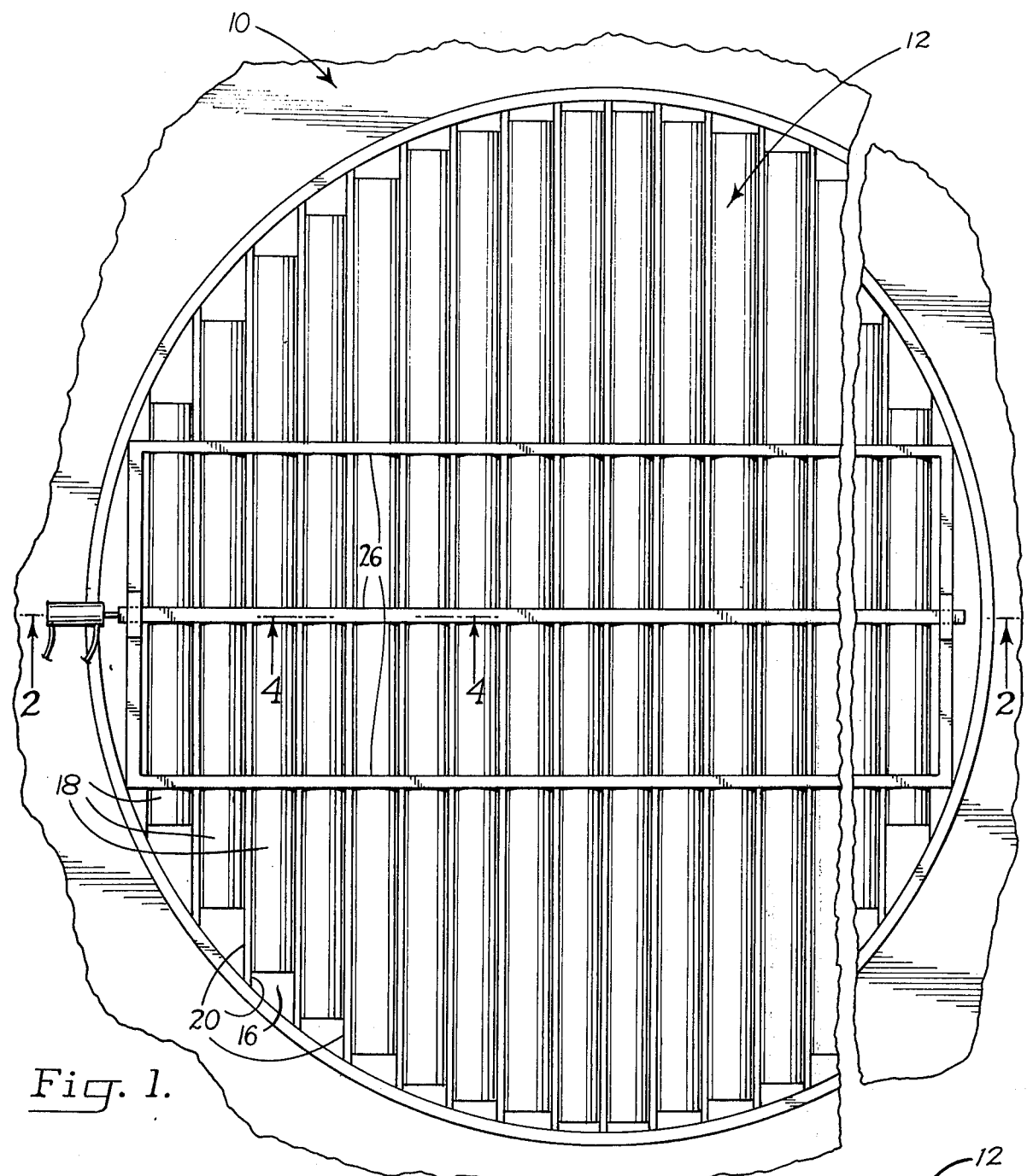
FIG. 1 is a plan view illustrating a form of heating apparatus as contemplated herein.

Referring now to the drawings, and first of all more to particularly to FIG. 1, illustrated grenerally at 10 is a portion of a roof of a dwelling. In the particular embodiment of the invention disclosed, the roof is flat and occupies a horizontal plane, although obviously the solar heating apparatus of the invention may be incorporated with other roof styles and shapes.

Supported adjacent the roof and forming a protective covering for heat collector means disposed below it is what is referred to herein as a canopy, indicated at 12. In the embodiment of the invention illustrated in FIG. 1, canopy 12 has a circular peripheral outline although the canopy may take other shapes in other forms of the invention. The canopy extends generally in a plane which parallels the roof plane, and it is at or adjacent the level of the roof to minimize exposure to wind damage, and for aesthetic reasons since by being so located, the canopy is relatively unobtrusive.

The canopy in the particular embodiment of the invention being described provides the reflector assembly in the solar heating apparatus. Explaining the canopy in more detail, such includes what is referred to herein as a holder 16 and revolvably supported on said holder multiple elongate cylindrical reflector bodies, indicated at 18. Holder 16 in the form of the invention shown in FIGS. 1 and 2 comprises a panel which is imperforate and made of light pervious material, such as a transparent plastic. The panel has a circular outline corresponding to the outline of canopy 12. One side of the panel, i.e., its upper side which is facing the viewer in FIG. 1, is channeled, in that such is provided with multiple, elongate channels or grooves 20 of semicylindrical cross section extending over the upper face of the panel.

Cylindrical reflector bodies 18 are revolvably seated in channels 20. Each body is made of light pervious or transparent material such as a suitable plastic. The bodies are solid and have prepared extending axially therealong and extending diametrically across each body a reflector or mirror surface 22.

Figure 4:
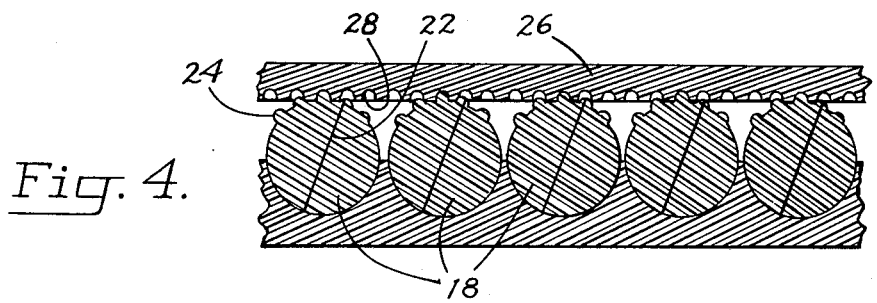
FIG. 4 is a cross-sectional view taken along the line 4—4 in FIG. 1.

Means is provided for adjusting the reflector bodies by rotating them about their axes. More specifically, and referring to FIG. 4, each of the bodies between their ends is provided about a portion of the periphery thereof with protruding teeth 24. Superimposed over the bodies is a rack 26 with indents 28 meshing with these teeth. It should be obvious that with longitudinal shifting of the rack, utilizing fluid motor 30 shown in FIG. 1, the bodies are rotated to change the angle of the mirror or reflector surfaces carried internally of the reflector bodies.

In the canopy described, the various reflector bodies are parallel to each other and collectively occupy substantially a plane. The underlying holder or panel extends substantially parallel to this plane of the bodies, and being imperforate, provides a watertight shield for the heat collector means which is disposed below it.

Figure 2:
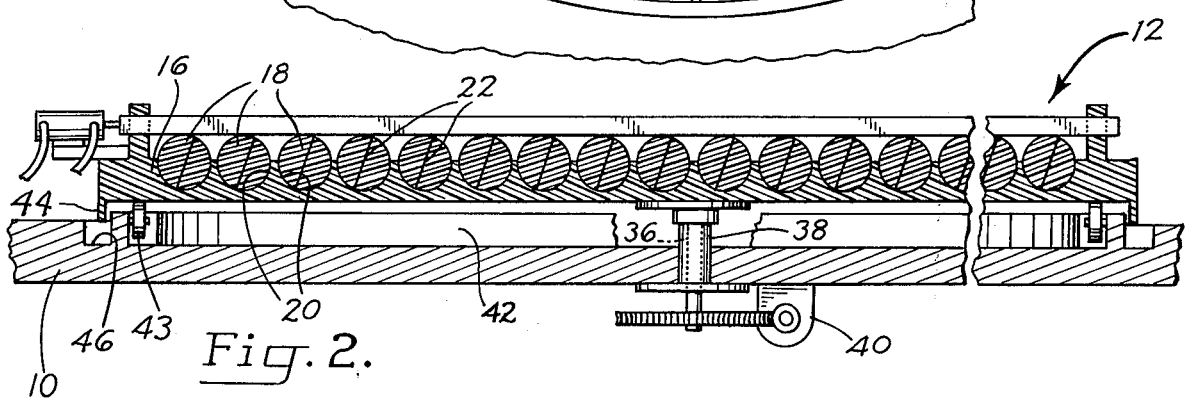
FIG. 2 is a cross-sectional view, taken along the line 1—2 in FIG. 1, illustrating further details of the reflector assembly and the heat collector means which is provided beneath the reflector assembly.

It is further contemplated, in the embodiment of the invention shown in FIGS. 1 and 2, that the canopy, comprising the holder, the reflector bodies and the actuating mechanism associated therewith, be a revolvable axis extending normal to the plane of the canopy, thereby to alter the axial orientation of all the reflector bodies simultaneously. For this purpose, a post 36 is provided extending downwardly from the canopy which is revolvably mounted in bearing structure 38. Motor means 40 drivingly connected to the post provides a means for rotating the canopy under power.

Disposed beneath the canopy and adapted to have the rays of the sun reflected thereagainst by the reflective surfaces in the bodies 18, is heat collector means 42 (see FIG. 2). Such may take any number of various forms, and is shown schematically in the drawings. Typically, such heat collector means will include means for channeling a fluid medium therethrough, which is effective to be heated by the rays of the sun, with such heated medium then being circulated elsewhere through the dwelling to perform the heating function.

The canopy may be rotatably adjacent its periphery by rollers, such as roller 43 illustrated in FIG. 2.

The apparatus further includes, as illustrated in FIG. 2, an annular skirt 44 depending downwardly from the canopy. A gutter 46 collects water which drains from the canopy, such gutter being connected to a usual drainage line whereby the water is drained from the roof of the dwelling.

Figure 3:
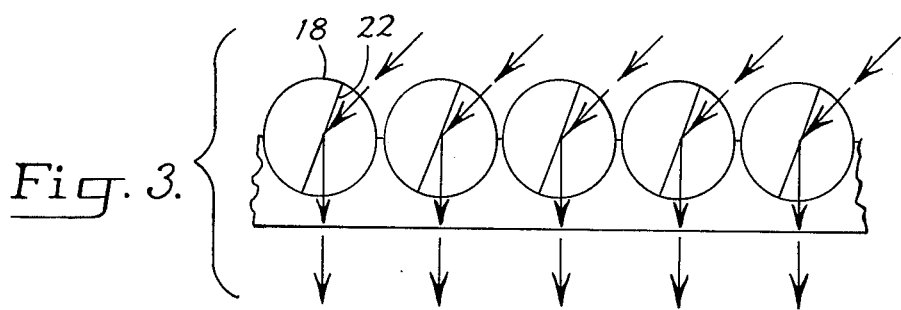
FIG. 3 is a schematic illustration of the reflector assembly.

As contemplated herein, and during the course of a day, the canopy is adjusted by rotating it about the axis of post 36 to orient the cylindrical bodies so that their axes extend normal to the rays of the sun impinging upon the reflector bodies. The bodies themselves are rotated about their axes, using rack 26, to adjust the reflector surfaces internally of the bodies so that the rays of the sun are reflected directly downwardly against the heat collector means disposed below the canopy. Thus, and referring to FIG. 3, the sun's rays at a typical time during the day might be assumed to be directed downwardly against the canopy at an angle of about 45°. Under such circumstances, the bodies 18 are positioned so that their reflector surfaces reflect the rays downwardly at right angles against the heat collector means, the reflector surfaces, therefore, being set at a 67.5° angle with respect to a horizontal plane.

As the sun progresses across the sky, suitable adjustments are made in the canopy to maintain the axes of bodies 18 normal to these rays, and to maintain the angle of the reflector surfaces therein properly adjusted to direct such rays downwardly against the heat collector means therebelow.

Figure 5:
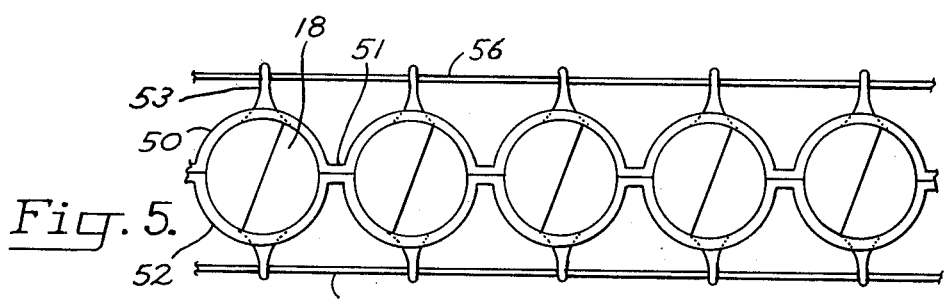
FIG. 5 illustrates a modification of the invention.

In FIG. 5, another form of the invention is illustrated. In this form of the invention, the cylindrical reflector bodies 18 are revolvably seated in a holder comprising opposed sheets of transparent, flexible, plastic material, shown at 50 and 52. Between the adjacent reflector bodies the sheets are joined together as at 51, as by heat sealing with a thermoplastic material, or an adhesive. Cords 56 secured to levers 53 appended to the ends of the bodies 18 provide a means for rotating the bodies about their axes thus to change the angular position of the reflective surfaces carried internally of the bodies.

Figure 6:
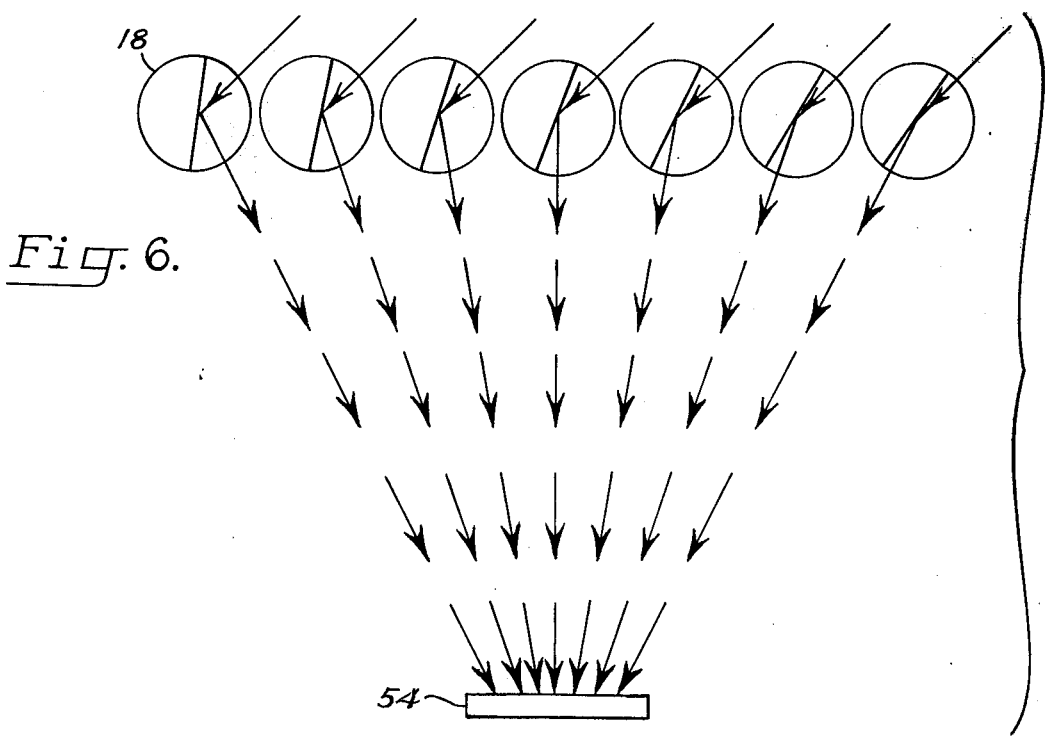
FIG. 6 is a schematic illustration of yet another modification.

Yet another modification of the invention is shown in FIG. 6. In this instance, the reflector bodies may be revolvably seated in a panel holder taking the form of the holder described in connection with the first described modification of the invention. It will be noted, however, that the mirror surfaces of the various reflector bodies are angularly offset from each other a slight amount, whereby the rays of the sun are reflected along converging paths beneath the canopy, to effect focusing of such rays on heat collector 54 which is disposed below the canopy.

It will be noted from the above that the heating apparatus contemplated is relatively simply constructed. The apparatus may be incorporated with the roof of a dwelling to provide for more efficient collection of the heat from the sun, with adjustments made in the reflector assembly of the apparatus to compensate for the movement of the sun during the course of the day. The apparatus, when installed, is relatively inconspicuous, and need not protrude any great amount from the dwelling of the house whereby the same would be subject to buffeting and wind damage.

Various modifications of the invention have been described, and it is intended to cover all such modifications and variations as will be apparent to one skilled in the art.

It is claimed and desired to secure by Letters Patent:

1. In solar heating apparatus,
   heat collector means for collecting solar heat,
   a canopy disposed over said heat collector means including multiple elongate cylindrical reflector bodies disposed substantially parallel to one another in said canopy, said reflector bodies having reflector surfaces extending axially therealong disposed internally thereof operating to reflect the sun's rays so that such pass to the collector means, and
   means for adjusting said reflector bodies by rotating them about their axes whereby to compensate for a change in the angle of incidence of the sun's rays against the reflector surfaces in the passage of such rays toward the collector means.

2. The heating apparatus of claim 1, wherein said reflector surfaces of the reflector bodies are angularly offset from parallilism whereby to focus the sun's rays on the collector means.

3. The heating apparatus of claim 1, wherein the canopy is adjustable to alter the position of all the reflector bodies simultaneously.

4. The heating apparatus of claim 1, wherein said reflector bodies in said canopy collectively define a plane and wherein a substantially imperforate light pervious holder substantially paralleling said plane rotatably supports said reflector bodies.

5. The heating apparatus of claim 4, wherein said light pervious holder comprises an expanse of light pervious material channeled over one side thereof to provide revolvable seats for said bodies.

6. In solar heating apparatus,
   a reflector assembly comprising multiple elongate cylindrical reflector bodies disposed substantially parallel to one another and collectively substantially defining a plane,
   said reflector bodies having reflector surfaces extending axially therealong disposed internally thereof operating to reflect the sun's rays, and
   a substantially imperforate light pervious holder substantially paralleling the plane of said reflector bodies rotatably supporting said reflector bodies.

7. The solar heating apparatus of claim 6, wherein said light pervious holder comprises an expanse of light pervious material channeled over one side thereof to provide revolvable seats for said bodies.

8. The heating apparatus of claim 6, wherein the holder comprises opposed sheets of material disposed on opposite sides of the reflector bodies which sheets join between adjacent reflector bodies.

9. The heating apparatus of claim 8, wherein said sheets are flexible.

10. A reflector assembly comprising multiple elongate cylindrical reflector bodies disposed substantially parallel to one another and collectively substantially defining a plane, said reflector bodies having reflector surfaces extending axially therealong disposed internally thereof, and means mounting said reflector bodies comprising opposed sheets of flexible material extending over opposite sides of said reflector bodies which sheets join with each other between adjacent reflector bodies.

* * * * *